United States Patent

[11] 3,547,268

[72] Inventor Frank H. Passalaqua
 Conroe, Tex.
[21] Appl. No. 844,138
[22] Filed July 23, 1969
 Continuation-in-part of Ser. No. 664,004,
 Aug. 29, 1967, abandoned.
[45] Patented Dec. 15, 1970
[73] Assignee Industrial Filter & Pump Mfg. Co.
 Cicero, Ill.
 a corporation of Illinois

[54] FILTRATION PROCESS
 2 Claims, 1 Drawing Fig.

[52] U.S. Cl. .................................................... 210/71,
 210/73, 75; 260/409, 428, 449.6
[51] Int. Cl. .................................................... B01d 37/00
[50] Field of Search .................................................... 210/70,
 71, 73—76, 181, 182, 186, 193; 260/409, 422, 449.6

[56] References Cited
UNITED STATES PATENTS

| | | | |
|---|---|---|---|
| 2,025,570 | 12/1935 | Clark............................ | 210/193 |
| 2,438,082 | 9/1947 | King et al..................... | 210/181X |
| 2,520,425 | 8/1950 | Mills............................. | 260/409 |
| 2,618,644 | 11/1952 | Bailey........................... | 260/428 |
| 2,751,304 | 6/1956 | Bates et al. ................... | 260/428X |
| 2,849,120 | 8/1958 | McMichael et al........... | 210/193 |
| 3,215,275 | 11/1965 | Bastecky et al.............. | 210/71X |
| 3,271,433 | 9/1966 | Bentz .......................... | 260/409 |

Primary Examiner—John Adee
Attorney—Fidler, Bradley, Patnaude & Lazo

ABSTRACT: In a hardening operation for vegetable oils in which nickel is a catalyst, particles of nickel carried as impurities by the oil are removed from the oil within a pressure filter that is downstream of the converters. The oils are filtered at high temperatures such as 425° Fahrenheit in the pressure filter under a blanket of nitrogen prior to polish filtering, cooling and storing.

PATENTED DEC 15 1970
3,547,268
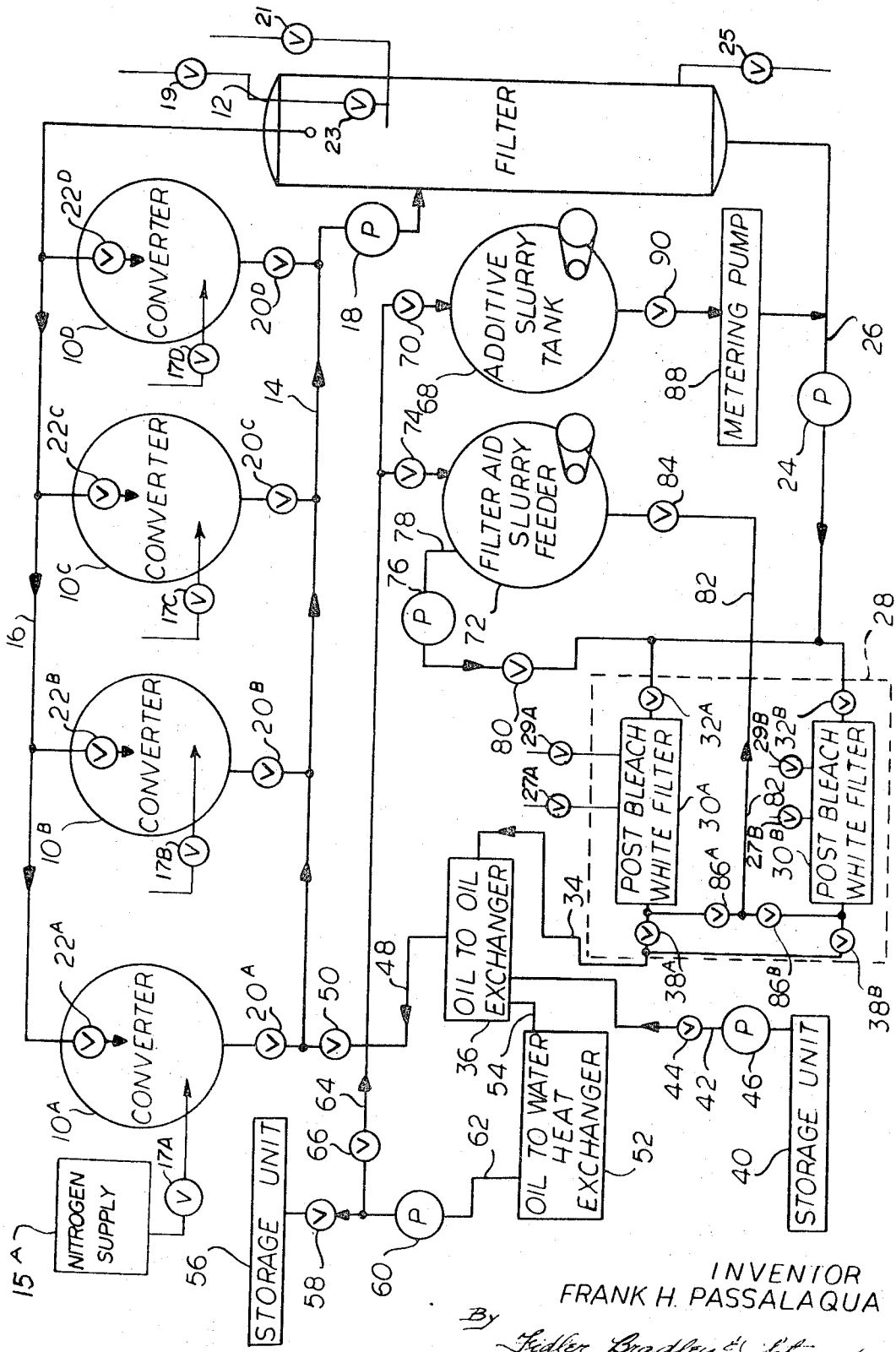
INVENTOR
FRANK H. PASSALAQUA
By Fidler, Bradley & Schwartz
ATTYS 3,547,268

FILTRATION PROCESS

This application is a continuation-in-part of my U.S. application, Ser. No. 664,004, filed Aug. 29, 1967 now abandoned for Filtration Process.

This invention relates to a method for processing liquids and more particularly relates to such a method that includes a provision for filtering solids from the liquids.

In some liquid processing applications, the liquid is brought into contact with solids at an elevated temperature. Often particles of these solids are retained in the liquid after the chemical reaction is completed. For example, in the hardening of vegetable oils, nickel is added as a catalyst. The vegetable oils are heated in the presence of the nickel as part of the hardening operation. After the hardening operation is completed, particles of the nickel remain in the oils as impurities that must be removed.

In one prior art system for removing the nickel particles, the liquid is cooled prior to separating the solids. The cooled liquid is then passed through a plate and frame press-type filter to remove the solids. The liquid is cooled before filtering because it is rapidly degraded if it is exposed to air during the filtering at the elevated temperatures.

In another system, pressurized filters are used instead of the plate and frame press filter to achieve faster filtering rates and to save space, thereby achieving economy in the filtering operations.

It has been thought that liquids such as vegetable oils bearing nickel would be degraded in the pressurized filters if the filtering was done at an elevated temperature in a system that allows the admission of air. Persons skilled in the art believed the combination of a high temperature and air accelerated the degradation of the liquid. Because of this, it was believed necessary to cool the liquid to a lower temperature prior to filtering.

The prior art systems for filtering the solids from the liquid require additional time and equipment because the liquid has to be cooled before it is filtered. Because of this, the liquid is not recirculated between the converters and the filter at high temperatures even though such recirculation is useful in processing the liquid. Moreover, in many applications the liquid must be filtered before other time consuming operations can be performed upon it, which operations could advantageously be performed on the heated liquid if it were not necessary to cool it for filtering. All of these factors tend to increase the time and equipment required to process the liquids with these prior art systems.

Accordingly, it is an object of this invention to provide an improved method for filtering solids from liquids.

It is a further object of this invention to provide an improved method for processing liquids at high temperatures.

It is a still further object of this invention to provide a filtration method for removing nickel particles from vegetable oils after hardening thereof which method is rapid and economical and which apparatus is inexpensive.

It is a still further object of this invention to provide a filtration process for removing particles of a catalyst carried by a liquid as impurities which process and apparatus require fewer heating and cooling operations.

It is a still further object of this invention to provide a method for filtering liquids at an increased rate.

It is a still further object of the invention to provide a liquid processing system in which the filtering and chemical processing operations overlap.

In accordance with the above and further objects of the invention, a liquid is processed in a converter at an elevated temperature in the presence of solid particles of catalyst and in the presence of a filter aid. An elevated temperature is a temperature higher than 220° F. It is fed directly from the converter to a pressure filter while remaining at the elevated temperature. The liquid is recirculated between the converter and the filter until a coat is developed on the filter leaves. While the coat is accumulating on the filter leaves, the liquid is circulating over the catalyst and reactants in the converter so as to continue processing. After the coat accumulates on the filter leaves and the liquid filtered therethrough is clear, it is drained from the filter and pumped to a polish filtering station to remove any remaining small solid particles. From the polish filtering station, the liquid, which may be a vegetable oil, passes through an oil-to-oil heat exchanger that removes heat and applies it to unprocessed oil prior to feeding the oil into the converter for processing. The filtered liquid is fed from the oil-to-oil heat exchanger to a oil-to-water heat exchanger where it is cooled to a suitable temperature for storage. The processing is done under a blanket of nitrogen.

This processing technique has several advantages. Firstly, the liquid is not degraded by the filtering at high temperatures and pressures under the blanket of nitrogen. Secondly, the catalyst stays active longer. Thirdly, the converters and pressure filter are emptied rapidly to free the system for processing another batch sooner. Fourthly, the liquid is filtered at a higher rate in the pressure filter when it is at an elevated temperature than would be possible in the same filter were it at a lower temperature. Fifthly, the process is speeded because the liquid is circulated over the catalyst while a coat is being formed on the leaves of the filter.

The above noted and other features of the invention will be understood more fully from the following detailed description when considered with reference to the accompanying drawing.

The drawing has a single FIG. diagrammatically illustrating a system for hardening vegetable oils and including the filtration process which is an embodiment of the invention.

PROCESSING SYSTEM

In the drawing a completely closed system is shown for the hardening of vegetable oils in accordance with an embodiment of the invention, which system includes four converters 10A—10D, a pressure filter 12, a polish filtering station 28 and two heat exchangers 36 and 52. The converters 10 communicate through a system of conduits, valves and pumps with the oil-to-oil heat exchanger 36 and with the pressure filter 12, receiving untreated vegetable oil from storage through the heat exchanger 36 and later delivering it to the filter 12. In another embodiment, not shown, the converters 10 receive the untreated vegetable oil directly from a storage unit 40 and the oil does not pass through a heat exchanger. The polish filtering station communicates with the pressure filter 12 and the oil-to-oil heat exchanger through a system of conduits, valves and pumps, receiving the oil from the filter and delivering it to storage through the heat exchangers 36 and 52 after filtering it.

The four converters 10A—10D each have a capacity of 32,000 pounds of vegetable oil. They also contain a catalyst such as nickel and a filter aid for a purpose to be explained hereinafter. The oil is heated to an elevated temperature and processed in the converters, which causes it to retain nickel particles from the nickel that is used as a catalyst.

Two conduits 14 and 16 connect each of the four converters 10A—10D to the pressure filter 12 to permit the recirculation of oil therebetween by a centrifugal pump 18, which pump is connected to the conduit 14. Each of the four converters 10A—10D communicates with the conduit 14 through a respective one of the four valves 20A—20D and with the conduit 16 through a respective one of the valves 22A—22D.

A pump 24 pumps the filtered oil from the pressure filter 12 through a conduit 26 to a polish filtering station 28, the conduit 26 communicating at one end with the outlet of the filter 12 and communicating at the other end with the inlet to the polish filtering station 28. The polish filtering station 28 includes two post bleach white filters 30A and 30B which communicate in parallel with the conduit 26 through the valves 32A and 32B respectively. An output conduit 34 communicates at one end with oil-to-oil heat exchanger 36 and communicates at the other end with the polish filtering station 28. The output conduit 34 communicates with each of the two filters 30A and 30B of the polish filtering station 28 in parallel through the respective valves 38A and 38B. The filters 30A and 30B remove any small particles that remain in the oil after being filtered in the main filter 12.

A storage unit 40 includes one or more tanks containing untreated oil. It communicates with the converters 10 through an oil-to-oil heat exchanger 36, being connected to the oil-to-oil heat exchanger 36 through a conduit 42, a valve 44 and a pump 46. The oil-to-oil heat exchanger is connected to the conduit 14 through the conduit 48 and the valve 50. Oil from the conduit 14 flows to a selected one of the converters 10 through its corresponding one of the valves 20. The filtered oil entering the oil-to-oil heat exchanger 36 releases heat to the untreated oil passing through and, after leaving the oil-to-oil heat exchanger, flows to an oil-to-water exchanger 52 through a conduit 54. It is pumped from the oil-to-water heat exchanger 52 into the final storage bin 56 through the valve 58 by means of a pump 60.

While the oil-to-oil heat exchanger 36 is useful in reducing the cost and time for heating untreated oil, it is not necessary to the operation of the invention. The untreated oil may be applied directly to the converters from storage and heated therein. Likewise, the treated oil may be cooled directly in an oil-to-water heat exchanger without first being partially cooled in an oil-to-oil heat exchanger.

Instead of being pumped to storage 56 the treated oil, which is now cooled, may be recirculated again for the purpose of carrying a filter aid material into the polish filtering station 28 or carrying an additive into the oil. For these two purposes a conduit 64 communicates at one end with the conduit 62 through the valve 66. The conduit 64 communicates in parallel at its other end with the additive tank 68 through a valve 70 and with the filter aid slurry feeder 72 through the valve 74.

A pump 76 communicates with the filter aid slurry feeder 72 through a conduit 78 through which it withdraws oil bearing a filter aid material and communicates with the polish station 28 through the valve 80 into which it pumps the oil and filter aid to precoat the filter 30. A return conduit 82 communicates at one end with the filter aid slurry feeder 72 through the valve 84 and communicates at its other end with the filters 30A and 30B in parallel through the valves 86A and 86B respectively to form a recirculation path including the polish filtering station 28 and the filter aid slurry feeder 72. By means of this recirculation path, cooled oil applied to the filter aid slurry feeder from the oil-to-water heat exchanger 52 is recirculated between the filter aid slurry feeder 72 and the polish filtering station 28 to precoat the filters 30A and 30B with the filter aid material contained within the filter aid slurry feeder 72.

Cooled oil from the oil-to-water heat exchanger 52 may be applied to the additive slurry tank 68 through the valve 70. The conduit 26, leading between the pressure filter 12 and the polish filtering station 28, communicates with the additive slurry tank 68 through a valve 90 and metering pump 88. By means of this conduit, additives may be added to the oil and mixed therein before it is cooled and stored within the tanks of the storage unit 56.

To prevent the heated oil from contacting the air and being degraded by oxygen, nitrogen is introduced into the system from a supply of nitrogen 15A. The supply of nitrogen 15A communicates with several units of the system at a pressure of 15 pounds per square inch through the following arrangements: (1) with each of the converters 10A—10D through corresponding valves 17A—17D; (2) with the pressure filter 12 through the valves 19 and 23; (3) with the post bleach white filter 30A through the valve 27A; and (4) with the post bleach white filter 30B through the valve 27B. The post bleach white filter 30A communicates with a venting valve 29A and the post bleach white filter 30B communicates with a venting valve 29B. The pressure filter 12 also communicates with a source of nitrogen at a pressure of 40 pounds per square inch through the valve 21 to provide a source of nitrogen for blowdown operations. This filter is vented through the valve 25.

One type of additive that is advantageously mixed into the vegetable oil is citric acid. If citric acid is fed into the vegetable oil, it is unnecessary to use a post hardening tank, thus reducing the cost of hardening the oil.

OPERATION

The vegetable oil that is to be hardened is contained in the storage unit 40. It is pumped from the storage unit 40 by means of the pump 46 through the conduit 42 and an open valve 44 into the oil-to-oil heat exchanger 36.

In the case of vegetable oil, it enters the heat exchanger 36 at a temperature of 110° F. It receives more heat from the already-processed oil passing through the oil-to-oil heat exchanger 36 so that its temperature is raised to 220° F. From the oil-to-oil heat exchanger 36, the oil is fed into successive ones of the converters 10 to fill them through the conduits 48 and 14. The oil is applied to the conduit 14 from the conduit 48 through the open valve 50 and from the conduit 14 to a selected one of the converters 10 through a corresponding one of the valves 20. Each of the converters 10 are filled in succession.

After the converters are filled, the valve 50 is closed and nitrogen is introduced into the system by opening the valves 17, 19, 23 and 27. After the system is free of air, the oil is processed in the converters under a blanket of nitrogen. During this processing the oil is heated to a temperature of 425° F. in the converters. The converters contain nickel as a catalyst and may also contain a filter aid such as that sold under the brand name Filter-Cel.

While the oil is in the converters, it receives and carries therefrom undesirable solid particles, which in the case of vegetable oil that is being hardened, comprise the nickel that is used as a catalyst in this process. To filter the nickel impurities from the oil in a selected one of the converters 10, a corresponding valve 20 is opened and the pump 18 is started to apply the oil from the converter to the inlet of the pressure filter 12. The corresponding valve 22 is also opened so that the oil is recirculated back into the converter from the pressure filter until it runs clear. During this operation the valve 50 in the conduit 48 connecting the oil-to-oil heat exchanger to the conduit 14 remains closed.

As the oil recirculates between the converter and the pressure filter, a coat is developed on the leaves of the filter. Also, the oil is circulated over the catalyst and continues to be processed. This filtration takes place at the elevated temperature of 425° F. which is the proper temperature for processing of the oil in the converter. Since the filtering is done at the same temperature as the processing within the converter, parts of the two operations can be combined by recirculating the oil between the converters and the filter. No precoating is necessary on the leaves of the filter 12. By this method the oil from each of the converters 10 is successively filtered until the nickel particles have been removed.

Whenever the oil being recirculated through one of the converters 10 is clear, it is passed through the filter 12 to the outlet leading to the converter 26 rather than continuing to recycle along the conduit 16. In this manner the filter handles batches of 32,000 lbs. of oil in succession from the converters 10. It may handle six to eight of such batches without changing the filter leaves.

The filtration may take place at 425° F. in the case of some vegetable oils such as soybean oil and may handle 5.5 pounds per square foot of filter per minute through a filter. When it is done at this temperature, between six to eight batches of 32,000 pounds of oil each may be filtered without removing the filter cake. If filtration is done at the lower temperature of 220° F., the processing takes place at a speed of 4.1 pounds per square foot of filter per minute. Approximately four batches of 32,000 pounds are processed without removing the filter cake. A typical filter may have 282 square feet.

The filtered liquid from the pressure filter 12 is pumped from the conduit 26 by the pump 24 into the polish filtering station 28 and through the open valves 32A and 32B through the post bleach white filters 30A and 30B respectively. These filters, within the polish filtering station 28, are precoated with a filter aid such as that sold under the trademark Filter-Cel. The manner of applying this precoat will be explained hereinafter.

From the polish filtering station 28, the oil is applied to the oil-to-oil heat exchanger 36 through the conduit 34 and the opened valves 38A and 38B. It is cooled while flowing through the oil-to-oil heat exchanger, passing heat to the incoming unprocessed oil. From the oil-to-oil heat exchanger, the oil flows to the oil-to-water heat exchanger 52. In one embodiment, it enters the oil-to-oil heat exchanger 36 at a temperature of approximately 425° F. and enters the oil-to-water exchanger at a temperature between 260° to 280° F. It is further cooled in the oil-to-water heat exchanger 52 and then pumped to the storage unit 56 at a temperature of 169° F. The oil would be degraded if stored exposed to air at a temperature above this. The oil is pumped to the storage unit 56 through the conduit 62 and the opened valve 58 by the pump 60.

Instead of pumping oil directly to the storage unit, the cooled oil may be used to precoat the post bleach white filters 30A and 30B. To accomplish this, the valve 58 is closed and the valve 66 is opened to pump the cooled oil from the oil-to-water heat exchanger 52 to the conduit 64. By opening the valve 74, this cooled oil is applied to the filter aid slurry feeder 72 where it picks up and carries some of the filter aid material.

By opening the valves 80, 32, 86, and 84, the oil is recirculated along conduits 78 through the filters 30A and 30B in parallel, and through the conduit 82 back to the filter aid slurry feeder 72 until a proper coat has been built up on the filters 30A and 30B. The valves 74, 84, and 86 are then closed and the valves 38A and 38B opened so that no more oil is applied to the filter aid slurry feeder 72 and so that the remainder of the oil in it flows through the oil-to-oil heat exchanger 36. After opening the valve 58, the oil is again pumped to the storage unit 56.

The cooled oil from the oil-to-water heat exchanger 52 may also be used to apply a measured amount of additive such as citric acid to the filtered oil. To accomplish this, the cooled oil is permitted to flow into the conduit 64 by closing the valve 58 and opening the valve 66. The valve 70 is also opened, permitting oil to pass into the additive slurry tank 68. The valve 90 is opened which causes the oil to be pumped by the metering pump 88 back to the conduit 26 carrying with it a portion of the additive from the additive slurry tank 68. It is desirable to apply citric acid within the range of 1 to 10 pounds of citric acid for each 1,000 pounds of vegetable oil. This can be done by the proper adjustment of the metering pump 88.

After the proper amount of oil and additive has been added to the line 26 from the additive slurry tank 68, the valves 66 and 70 are closed and the valve 58 opened to permit all of the oil to be applied to the storage unit 56. In the alternative both the valves 58 and 66 may be opened in a fixed proportion so that some of the oil is recirculated through the additive slurry tank 68, carrying a fixed amount of additive into the filtered oil prior to its being stored in the storage unit 56.

Solid impurities such as nickel are effectively removed by filtering at an elevated temperature in a pressure filter under a nitrogen blanket without suffering any unusual degradation of the oil carrying the solid impurities. By filtering the fluid at an elevated temperature in a pressure filter, a rate of filtering is obtained which is above that normally expected merely by the use of a pressure filter. Also, the processing of the oil is speeded because (1) it is circulated over a catalyst while a suitable coat is accumulating on the leaves of the filter; (2) the filtering is done rapidly by a pressure filter so as to free the converters to receive another batch of oil sooner than would be the case if a pressure filter were not used; (3) there is no delay for cooling the oil within the converters prior to filtering.

Although an embodiment of the invention has been described with some obvious that modifications and variations may be made in the embodiment without deviating from the teachings hereinabove. Accordingly, it is to be understood that, within the scope of the appended claims, the invention may be practiced otherwise than as specifically described.

I claim:

1. A process of treating oil with a solid metal catalyst at an elevated temperature within a system that includes at least one converter and one pressure filter, the process being such that solid particles of the catalyst are carried by the oil, comprising the steps of:
   inserting nitrogen gas into the system;
   inserting the catalyst in the converter;
   bringing the oil into intimate contact with the catalyst within the converter at an elevated temperature that is above 220° F.;
   pumping the oil from the converter through the pressure filter at the elevated temperature;
   filtering the solid particles of the catalyst from the oil within the pressure filter at the elevated temperature;
   said steps of bringing said oil into contact, pumping said oil, and filtering being performed in the presence of the nitrogen gas; and
   cooling said oil after filtering.

2. The process of claim 1 in which the steps of bringing said oil into contact, pumping said oil, and filtering are performed at a temperature of substantially 425° F., said steps further comprising the step of recirculating said oil through said pressure filter in said converter whereby said oil is repeatedly filtered and brought into intimate contact with said catalyst until the treatment of said oil with said catalyst has been completed.